Patented Mar. 13, 1923.

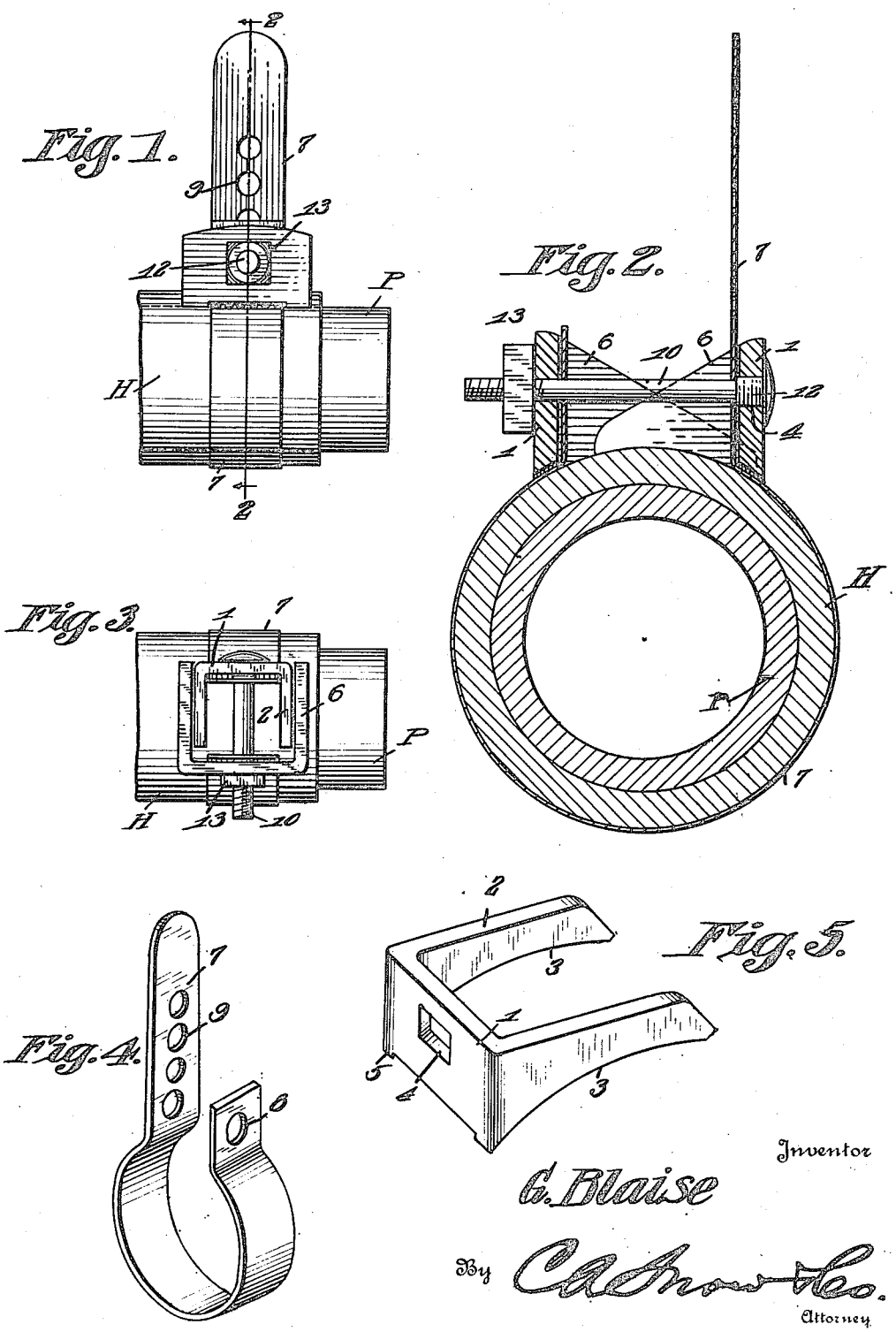

1,447,956

UNITED STATES PATENT OFFICE.

GEORGE BLAISE, OF KENEDY, TEXAS.

HOSE CLAMP.

Application filed August 25, 1922. Serial No. 584,332.

*To all whom it may concern:*

Be it known that I, GEORGE BLAISE, a citizen of the United States, residing at Kenedy, in the county of Karnes and State of Texas, have invented a new and useful Hose Clamp, of which the following is a specification.

This invention relates to clamps designed primarily for fastening hose to pipes such as used in the circulation system of automobiles, etc.

It is an object of the present invention to provide a clamp which will press the hose to the pipe throughout the circumference of the hose, thus to prevent leakage.

Another object is to provide a clamp which can be tightened with a wrench and can be used upon different sizes of hose and pipes with equal efficiency.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the clamp in position upon a hose.

Figure 2 is an enlarged section on line 2—2, Figure 1.

Figure 3 is a plan view of the clamp and hose shown in Figure 1.

Figure 4 is a perspective view of the band portion of the clamp.

Figure 5 is a perspective view of one of the yokes of the clamp.

Referring to the figures by characters of reference 1 designates a yoke having parallel side arms 2, one edge of each arm being concaved longitudinally as shown at 3 so as to conform substantially to the contour of the hose to which the yoke is applied. The intermediate portion of the yoke is formed with an angular opening 4 and the lugs 5 are preferably extended from the corner portions of the yoke where the intermediate portion thereof merges into the arms 2. Another similar yoke straddles the arms 2 of the yoke 1 the side arms of this yoke being longer than the arms 2 and being farther apart so that the yoke can be inserted between the arms of the yoke 6 as shown in Figure 3.

A metal band 7 is provided, this band being adapted to extend around the hose. An opening 8 is formed in one end portion of the band and a series of openings 9 are formed in the other end portion of the band. After the band has been placed around the hose 8 located on a pipe P, the yokes are oppositely disposed so as to straddle the end portions of the band and to interfit as shown in Figure 3. A bolt 10 is then inserted through the angular opening 4 in the yoke 1 and through an opening 11 in the yoke 6. This bolt has an angular portion 12 which fits within the angular opening 4. A nut 13 engages the threaded end of the bolt and serves to draw the yokes 1 and 6 toward each other, thus to contract the band 7 about the hose 8 and cause it to be compressed tightly upon the pipe. By providing the yokes 1 and 6 between the ends of the band that portion of the hose between said ends is held under compression by the arms of the yoke and leakage between the hose and the pipe at this point is thus prevented. By providing the corner lugs 5 on the yokes the yokes are enabled to straddle the band as shown particularly in Figure 1.

By providing openings 9 the band can be adjusted to hose of different diameters.

What is claimed is:—

1. A hose clamp including a flexible band, interfitting oppositely disposed yokes straddling the end portions of the band, each of said yokes having parallel arms adapted to bear inwardly upon that portion of the hose between the ends of the band, and a bolt extending through the yokes and end portions of the band for drawing said yokes and end portions toward each other.

2. A hose clamp including a flexible band having spaced end portions, opposed yokes straddling said end portions, one of said yokes being adjustable longitudinally within the other yoke, the arms of both yokes bearing inwardly against that portion of the hose between the ends of the band, and a bolt connecting the yokes and extending through the end portions of the band.

3. A hose clamp including a flexible band having spaced end portions, opposed yokes straddling the respective end portions, one of said yokes being adjustable longitudinally within the other yoke, the arms of both yokes bearing inwardly against that portion of the hose between the ends of the band, and means connecting the yokes for securing them to the bands and adjusting them toward each other.

4. A hose clamp including a flexible band having its ends spaced apart, opposed yokes straddling the end portions of the band, each yoke having parallel arms for bearing inwardly against that portion of a hose between the ends of the band, the hose engaging edges of the arms being concaved longitudinally, lugs upon the yokes for straddling the band, and means extending through the yokes and the end portions of the band for fastening them together and for tightening the band about the hose engaged thereby.

In testimony that I claim the foregoing as my own, I have hereto affixed my signature in the presence of two witnesses.

GEORGE BLAISE.

Witnesses:
E. T. LEWELLEN,
E. D. HALCHAK.